(12) United States Patent
Glover

(10) Patent No.: US 6,288,872 B1
(45) Date of Patent: Sep. 11, 2001

(54) LIFTER DEVICE FOR MAGNETIC TAPE CARTRIDGE

(75) Inventor: Donnie Glover, Dothan, AL (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/443,355

(22) Filed: Nov. 19, 1999

Related U.S. Application Data

(62) Division of application No. 08/948,030, filed on Oct. 9, 1997, now Pat. No. 6,057,993.

(51) Int. Cl.$^7$ .................................................. G11B 23/087
(52) U.S. Cl. .................... 360/132; 360/130.33; 242/346
(58) Field of Search ................... 360/132, 130.3–130.33; 242/341, 345.2, 346, 347

(56) References Cited

U.S. PATENT DOCUMENTS

| | | | |
|---|---|---|---|
| 3,642,220 | * | 2/1972 | Merry ................................ 242/55.19 |
| 3,888,429 | * | 6/1975 | Mack ................................. 242/55.19 |
| 4,290,567 | * | 9/1981 | Saito ................................... 242/198 |
| 4,316,590 | * | 2/1982 | Satoh et al. ......................... 242/199 |
| 4,342,436 | * | 8/1982 | Oyama et al. ...................... 242/199 |
| 5,138,510 | * | 8/1992 | Ryu ..................................... 360/132 |
| 5,345,355 | * | 9/1994 | Teuber et al. .................... 242/343.1 |
| 5,477,406 | * | 12/1995 | Schaeffer et al. .............. 360/130.33 |
| 5,490,029 | * | 2/1996 | Madsen et al. ..................... 360/132 |
| 5,496,992 | * | 3/1996 | Nielsen ............................ 242/346.1 |
| 5,561,573 | * | 10/1996 | Morita ................................ 360/132 |
| 6,108,168 | * | 8/2000 | Clemons ............................. 360/132 |

FOREIGN PATENT DOCUMENTS 9-128935 * 5/1997 (JP) .

* cited by examiner

*Primary Examiner*—Jefferson Evans
(74) *Attorney, Agent, or Firm*—Ronald P. Kananen; Rader, Fishman & Grauer

(57) ABSTRACT

A lifter device, and a method of maintaining contact between a magnetic tape in a tape cartridge and an external read/write device using the lifter device that provides tension on the tape sufficient to maintain contact between the tape and a read/write device that physically contacts the tape within a bay portion of the tape cartridge.

11 Claims, 3 Drawing Sheets

LIFTER DEVICE FOR MAGNETIC TAPE CARTRIDGE

This application is a divisional of application Ser. No. 08/948,030 filed Oct. 9, 1997, now U.S. Pat. No. 6,057,993.

FIELD OF THE INVENTION

This invention relates to magnetic tape cartridges. More particularly, this invention relates to a spring structure, referred to as a "lifter," which maintains contact between a read/write device and the magnetic tape in a tape cartridge.

BACKGROUND OF THE INVENTION

Magnetic tape cartridges are widely used for data storage. A conventional magnetic tape cartridge comprises reel mounts on which tape reels are held in place. A magnetic tape is attached to two tape reels, and is wound around one or both of the reels. The reels are rotatable on the reel mounts, allowing the reels to transfer the commonly attached magnetic tape from one reel to the other upon rotation. A portion of the tape is exposed to the outside of the cartridge by means of an open bay portion which may comprise a door or other protective lid-type feature for protection of the tape when the cartridge is not in use.

When in use, the bay portion of the cartridge receives an external read/write device which sends information to be recorded onto a tape, or retrieves recorded information from the tape. The read/write device accomplishes this by entering the bay portion, and contacting the tape.

As the tape extends across the bay portion of the cartridge, and is moved from one reel to the other, the tension in the tape is the greatest when each reel is holding equal amounts of tape. However, when any one reel is holding more or less tape than the other reel, the tension in the tape can become insufficient for enabling continuous physical contact between the tape and the read/write device. This lack of tension in the tape, and in turn, lack of physical contact between the tape and the read/write device, causes the transfer of information between the two elements to fail. As a result, some or all of the information intended to be transferred will be missing upon playback or subsequent transferring of information.

Accordingly, there is a need to provide a magnetic tape cartridge which includes means for maintaining a desired level of tension in the magnetic tape, sufficient to enable complete and direct contact between a read/write device and the magnetic tape, thus ensuring accurate and complete transfer of information between the two elements.

There is also a need in the art for means for maintaining a desired range of tension in tapes included in existing magnetic tape cartridges which otherwise fail to transmit information between the tape and the read/write device. The range of tension should be sufficient to enable complete and direct contact between the read/write device and the magnetic tape, thus ensuring accurate and complete transfer of information between the two elements.

SUMMARY OF THE INVENTION

It is an object of the invention to meet the aforementioned needs. In fulfillment of this object, a magnetic tape cartridge having a lifter device is provided according to the present invention. The lifter device bends upward from a surface of the bay portion of the cartridge, beneath the exposed portion of the tape. The lifter device maintains a desired range of tension in the tape when the tape and the lifter device are in contact. This in turn maintains a sufficient amount of pressure between the read/write member and the tape.

It is a further object of the invention to provide a resilient, flexible, relatively rigid lifter device which will provide the desired tension in the magnetic tape over a wide range of temperatures which the cartridge may be subjected to during the normal course of operation. This object is accomplished by providing a lifter device which comprises a resilient, flexible, relatively rigid plastic sheeting, such as polyethylene terephthalate (PET) or teflon.

It is another object of the present invention to provide a lifter device which can be easily introduced into existing magnetic tape cartridges, to provide a desired range of tension in the magnetic tape. This object is accomplished by providing a lifter device which comprises a resilient, flexible, relatively rigid plastic sheeting, such as polyethylene terephthalate (PET) or teflon, which may be attached to the existing magnetic tape cartridge with an adhesive, and which bends upward from a surface of the bay portion of the cartridge beneath the exposed portion of the tape. The lifter device maintains a desired range of tension in the tape when the tape and the lifter device are in contact. This in turn maintains a sufficient amount of pressure between the read/write member and the tape to maintain contact between them.

Another object of the invention is to provide a method for maintaining contact between a magnetic tape in a tape cartridge and an external read/write device, including the steps of providing a bay portion in the tape cartridge wherein the tape is exposed outside the tape cartridge, providing a lifter device, and attaching the lifter device on a surface of the bay portion in a manner wherein the lifter device provides a sufficient range of tension in the tape to maintain said contact. As described above, the lifter device may be made from a resilient, flexible, heat resistant material such as polyethylene terephthalate (PET) or teflon.

BRIEF DESCRIPTION OF THE DRAWINGS

The present invention will be understood more fully from the detailed description given herebelow and from the accompanying drawings of embodiments of the invention. However, the drawings are not intended to imply limitation of the invention to a specific embodiment, but are for explanation and understanding only.

DESCRIPTION OF PREFERRED EMBODIMENTS

The problem of low tape tension when tape reels in a magnetic tape cartridge have unequal amounts of tape are overcome by the use of the lifter device as described above. Various materials were used to manufacture the lifter device. PET and teflon both were found to have excellent desired properties such as heat resistance, resilience, flexibility, and relative rigidity.

Lifter devices of various shapes were also made. The various shaped lifters were tested using magnetic tape cartridges that had previously failed to provide sufficient tension in the magnetic tape to maintain contact between the tape and a read/write device during normal use. In the following examples, the results of tests using lifters of different shapes are provided. The examples are not intended to limit the scope of the invention to the shapes of the lifter devices described therein. Rather, they are presented to establish the utility of the present invention with regard to the problems in the art described above, and in related arts.

EXAMPLES

Example 1

In a first example, the tension in a first quarter inch cassette (QIC) magnetic tape cartridge was measured by introducing a read/write device and measuring the pressure exerted on the read/write device. As the tape was transferred from one reel (1) to the other, contact between the read/write device and the tape was insufficient for transfer of information when the tension was 0.25 ounces.

Figure 1:
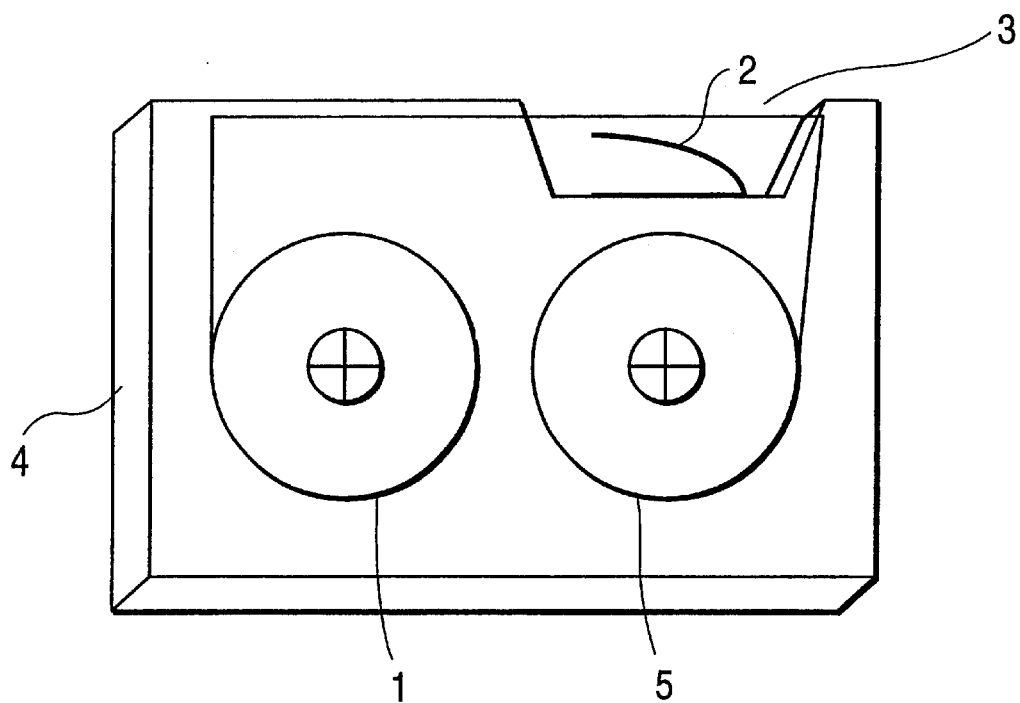
FIG. 1 is a front view of a conventional magnetic tape cartridge with a curved lifter device of the present invention attached.

As shown in FIG. 1, a curved lifter device (2) was placed in the bay region (3) of the cartridge (4). The tape (5) tension was measured again, under the otherwise same conditions as in the first trial. With the lifter device attached, the minimum tension in the tape was 0.94 ounces, almost twice the minimum tension limit necessary for ensured sufficient contact between the tape and the read/write device (0.5 ounces).

Example 2

In a second example, the tension in a second QIC magnetic tape cartridge was measured by introducing a read/write device and measuring the pressure exerted on the read/write device. As the tape was transferred from one reel to the other, contact between the read/write device and the tape was insufficient for transfer of information when the tension was 0.23 ounces.

Figure 2:
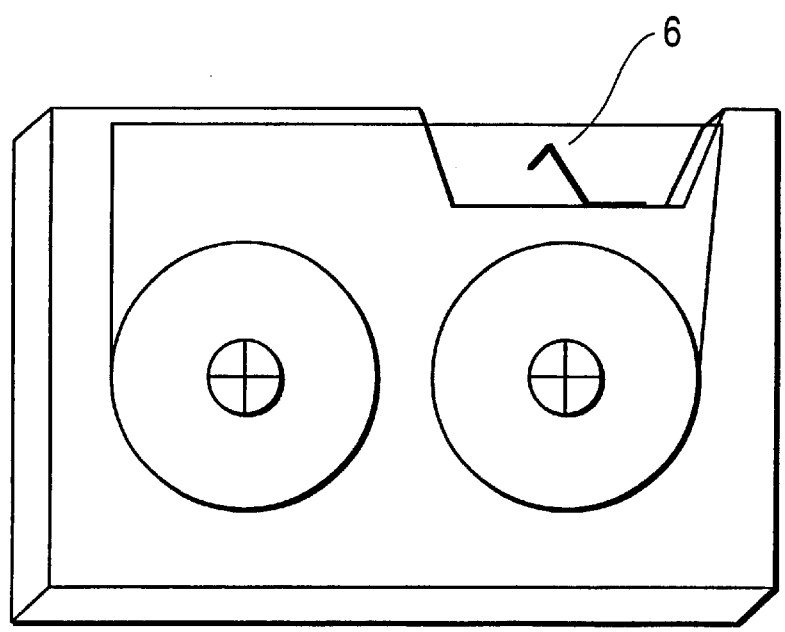
FIG. 2 is a top view of a conventional magnetic tape cartridge with a bent lifter device of the present invention attached, inclining from right to left at the center of the bay region of the cartridge.

As shown in FIG. 2, a bent lifter device (6), inclining from right to left at the center of the bay region, was placed in the cartridge. The tape tension was measured again, under the otherwise same conditions as in the first trial. With the lifter device attached, the minimum tension in the tape was 0.87 ounces.

Example 3

In a third example, the tension in a third QIC magnetic tape cartridge was measured by introducing a read/write device and measuring the pressure exerted on the read/write device. As the tape was transferred from one reel to the other, contact between the read/write device and the tape was insufficient for transfer of information when the tension was 0.27 ounces.

Figure 3:
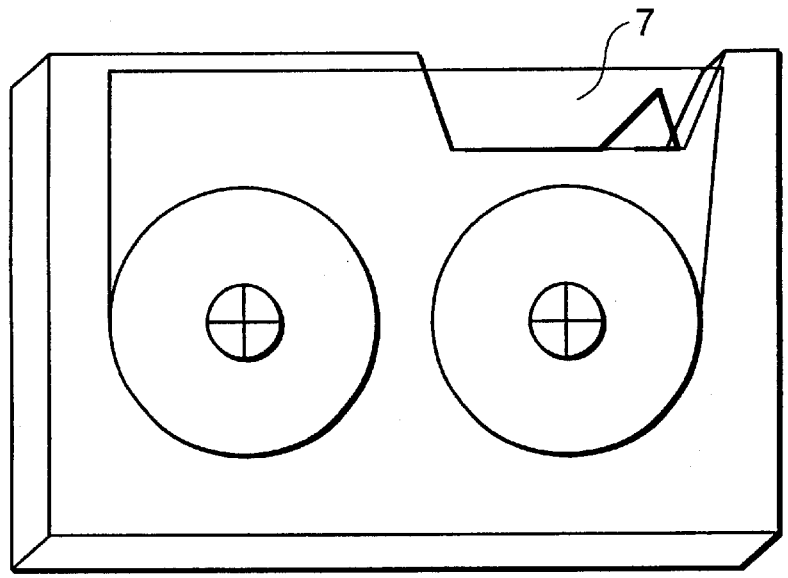
FIG. 3 is a top view of a conventional magnetic tape cartridge with a bent lifter device of the present invention attached, inclining from left to right at the right end of the bay region of the cartridge.

As shown in FIG. 3, a bent lifter device (7), inclining from left to right at the right side of the bay region, was placed in the cartridge. The tape tension was measured again, under the otherwise same conditions as in the first trial. With the lifter device attached, the minimum tension in the tape was 0.88 ounces.

Example 4

In a fourth example, the tension in a fourth QIC magnetic tape cartridge was measured by introducing a read/write device and measuring the pressure exerted on the read/write device. As the tape was transferred from one reel to the other, contact between the read/write device and the tape was insufficient for transfer of information when the tension was 0.28 ounces.

Figure 4:
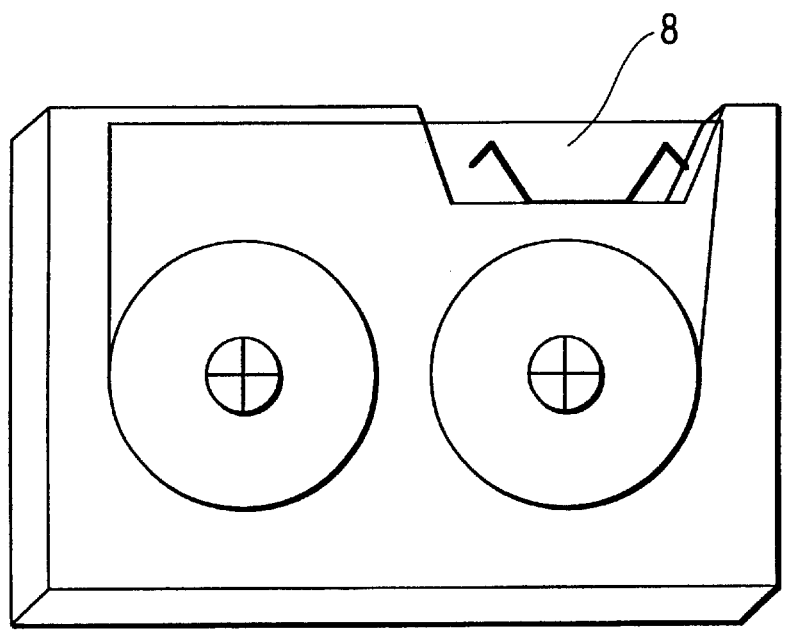
FIG. 4 is a top view of a conventional magnetic tape cartridge with a v-shaped lifter device of the present invention attached.

As shown in FIG. 4, a v-shaped lifter device (8) was placed in the cartridge. The tape tension was measured again, under the otherwise same conditions as in the first trial. With the lifter device attached, the minimum tension in the tape was 1.03 ounces.

Example 5

In a fifth example, the tension in a fifth QIC magnetic tape cartridge was measured by introducing a read/write device and measuring the pressure exerted on the read/write device. As the tape was transferred from one reel to the other, contact between the read/write device and the tape was insufficient for transfer of information when the tension was 0.29 ounces.

Figure 5:
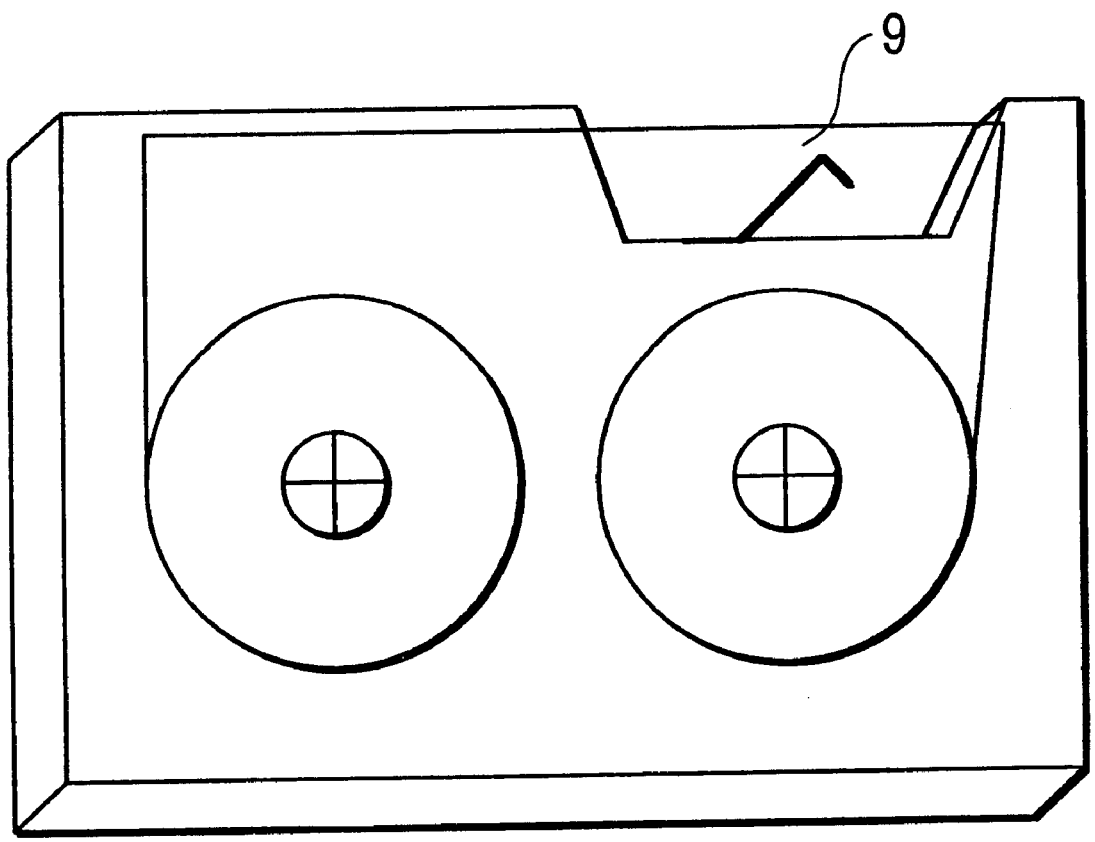
FIG. 5 is a top view of a conventional magnetic tape cartridge with a bent lifter device of the present invention attached, inclining from left to right at the center of the bay region of the cartridge.

As shown in FIG. 5, a bent lifter device (9), inclining from left to right at the center of the bay region was placed in the cartridge. The tape tension was measured again, under the otherwise same conditions as in the first trial. With the lifter device attached, the minimum tension in the tape was 0.60 ounces.

What is claimed is:

1. A lifter device, comprising:
    means for attaching said lifter device to a magnetic tape cartridge, wherein said cartridge comprises a magnetic tape, and a bay portion wherein said magnetic tape is exposed outside of said tape cartridge, and wherein a read/write device can physically contact said tape,
    said lifter device being of a construction and material sufficient to provide tension on said tape in the range of between about 0.3 ounces and about 3.5 ounces to maintain contact between said tape and said read/write device.

2. A lifter device as set forth in claim 1, said material is a resilient, flexible, heat resistant material.

3. A lifter device as set forth in claim 2, wherein said material is polyethylene terephthalate (PET) or Teflon.

4. A lifter device as set forth in claim 1, wherein the construction and said material of said lifter device are sufficient to provide tension on said tape in the range of between about 0.3 ounces and about 3.5 ounces.

5. A method for maintaining contact between a magnetic tape in a tape cartridge and an external read/write device, comprising the steps of:
    providing a bay portion, defined by a first horizontal exterior surface and inclining exterior surfaces extending above said first horizontal exterior surface when a second exterior surface of said magnetic tape cartridge that is adjacent to said inclining exterior surfaces is horizontally disposed as an uppermost surface, whereby said magnetic tape is exposed outside said tape cartridge; and
    attaching a lifter device on said first horizontal exterior surface of said bay portion, said lifter device being provided to cause sufficient tension in said tape to maintain said contact.

6. The method of claim 5, wherein the tension provided in said tape is in the range of between about 0.3 ounces and about 3.5 ounces.

7. The method of claim 6, wherein the tension provided in said tape is in the range of between about 0.5 ounces and about 1.5 ounces.

8. The method of claim 5 wherein said lifter device is made from a resilient, flexible, heat resistant material.

9. The method of claim 8, wherein said material is polyethylene terephthalate (PET) or Teflon.

10. A method for maintaining contact between a magnetic tape in a tape cartridge and an external read/write device, comprising the steps of:

providing a bay portion in said tape cartridge, said bay portion being defined by external and internal surfaces that provide an opening wherein said tape is exposed outside said tape cartridge; and attaching a lifter device on a surface of said bay portion in a manner wherein said lifter device provides tension in said tape in the range of between about 0.3 ounces and about 3.5 ounces to maintain said contact.

11. The method of claim 10, wherein the tension provided in said tape is in the range of between about 0.5 ounces and about 1.5 ounces.

* * * * *